(12) United States Patent
Mohtadi

(10) Patent No.: US 9,362,593 B2
(45) Date of Patent: Jun. 7, 2016

(54) BOROHYDRIDE SOLVO-IONIC LIQUID FAMILY FOR MAGNESIUM BATTERY

(71) Applicant: Toyota Motor Engineering & Manufacturing North America, Inc., Erlanger, KY (US)

(72) Inventor: Rana Mohtadi, Northville, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/541,088

(22) Filed: Nov. 13, 2014

(65) Prior Publication Data

US 2015/0072250 A1 Mar. 12, 2015

Related U.S. Application Data

(63) Continuation-in-part of application No. 13/720,522, filed on Dec. 19, 2012.

(51) Int. Cl.

| | |
|---|---|
| H01M 10/0567 | (2010.01) |
| H01M 4/134 | (2010.01) |
| H01M 4/38 | (2006.01) |
| H01M 10/054 | (2010.01) |
| H01M 10/0568 | (2010.01) |
| H01M 10/0569 | (2010.01) |
| H01M 4/02 | (2006.01) |
| H01M 10/0566 | (2010.01) |
| H01M 10/0565 | (2010.01) |

(52) U.S. Cl.
CPC .......... *H01M 10/0567* (2013.01); *H01M 4/134* (2013.01); *H01M 4/381* (2013.01); *H01M 10/054* (2013.01); *H01M 10/0568* (2013.01); *H01M 10/0569* (2013.01); *H01M 10/0565* (2013.01); *H01M 10/0566* (2013.01); *H01M 2004/027* (2013.01); *H01M 2300/0025* (2013.01); *H01M 2300/0028* (2013.01); *H01M 2300/0085* (2013.01)

(58) Field of Classification Search
CPC .......... H01M 10/054; H01M 10/0566; H01M 10/0567; H01M 10/0568; H01M 10/0569
See application file for complete search history.

(56) References Cited

U.S. PATENT DOCUMENTS

| | | | |
|---|---|---|---|
| 3,305,569 A | 2/1967 | Skoog | |
| 5,714,279 A * | 2/1998 | Zajac et al. | 429/344 |
| 2004/0002002 A1 * | 1/2004 | Mizuta et al. | 429/188 |
| 2009/0023074 A1 * | 1/2009 | Matsui et al. | 429/326 |
| 2011/0229772 A1 * | 9/2011 | Fujinami et al. | 429/337 |
| 2012/0114979 A1 * | 5/2012 | Kim et al. | 429/7 |
| 2013/0316249 A1 | 11/2013 | Higashi et al. | |
| 2014/0038037 A1 | 2/2014 | Mohtadi et al. | |
| 2014/0038061 A1 | 2/2014 | Mohtadi et al. | |
| 2014/0154592 A1 | 6/2014 | Mohtadi et al. | |
| 2014/0302400 A1 * | 10/2014 | Shao et al. | 429/326 |

FOREIGN PATENT DOCUMENTS

WO 2014031373 A1 2/2014

OTHER PUBLICATIONS

Ha et al., Magnesium(II) Bis(trifluoromethane sulfonyl) Imide-Based Electrolytes with Wide Eletrochemical Windows for Rechargeable Magnesium Batteris, ACS applied Materials & Interfaces, Undated, in 11 pages.
Gao et al., A Carbonium Pseudo Ionic Liquid with Excellent Extractive Desulfurization Performance (Abstract), Undated, in 1 page.
Mohtadi et al., Magnesium Borohydride: From Hydrogen Storage to Magnesium Battery**, Sep. 24, 2012, in 4 pages.
Shao et al., Coordination Chemistry in magnesium battery electrolytes: how ligands affect their performance, Sci. Rep., v.3, article No. 3130, published Nov. 4, 2013 (doi: 10.1038/srep03130), in 7 pages.
Mandai et al., Criteria for solvate ionic liquids, Phys. Chem. Chem. Phys., v.16, pp. 8761-8772, published online Mar. 12, 2014, in 14 pages.

* cited by examiner

*Primary Examiner* — Jeremiah Smith
(74) *Attorney, Agent, or Firm* — Christopher G. Darrow; Darrow Mustafa PC

(57) ABSTRACT

A method for forming a solvo-ionic liquid suitable for use as an electrolyte in an electrochemical cell is provided. The solvo-ionic liquid, a mixture including a multidentate ethereal solvent and magnesium borohydride, can be a liquid, a gel or a solid at room temperature and generally has high thermal stability including virtually no volatility at a typical cell operating temperature. An electrochemical cell having a solvo-ionic liquid as electrolyte is also disclosed. The electrochemical cell will typically be a rechargeable magnesium battery, having an anode suitable to accommodate magnesium oxidation during battery discharge.

20 Claims, 4 Drawing Sheets

BOROHYDRIDE SOLVO-IONIC LIQUID FAMILY FOR MAGNESIUM BATTERY

CROSS-REFERENCE TO RELATED APPLICATIONS

This application is a continuation-in-part of U.S. patent application Ser. No. 13/720,522 filed Dec. 19, 2012, and which is herein incorporated by reference in its entirety.

BACKGROUND

Ionic liquids, molten salts are more particularly, salts which are liquid at or near ambient temperature, are typically molecular pairs consisting of at least one large, organic ion. Low melting point ionic liquids tend to have considerable stability, and in particular low volatility, due to their intramolecular ionic attractions and also to their relatively large molecular size. Because of their high stability and low volatility even at elevated temperatures, such ionic liquids have been proposed to have utility as electrolytes in battery applications.

Disclosures related to the present one have shown that a number of magnesium salts with various boron-containing anions show significant potential as electrolyte components for magnesium batteries.

SUMMARY

A method for forming a solvo-ionic liquid for use as a battery electrolyte is provided. An electrochemical cell comprising a solvo-ionic liquid is also provided.

In one aspect, a method for forming a solvo-ionic liquid suitable for use as a battery electrolyte is disclosed. The method includes a step of combining a multidentate ethereal solvent with a salt mixture to produce a solvate. The salt mixture includes $Mg(BH_4)_2$ and the molar ratio of solvent to $Mg(BH_4)_2$ is within a range of 0.1:1 to 10:1,. The salt mixture can optionally include a second salt, which is $LiBH_4$, $NaBH_4$ or a combination thereof. The salt mixture can additionally include a third salt which has a lithium and/or magnesium cation and a fluorinated anion. In different variations, the third salt can include a magnesium or lithium fluorosulfonyl imide, trifluoromethano sulfonyl imide, or tetrafluoro borate. The salt mixture can optionally be ball-milled, and the solvate can optionally be mixed, for example by stifling, at room temperature or elevated temperature.

In another aspect, an electrochemical cell is disclosed. The electrochemical cell includes a magnesium anode, a cathode, and a solvo-ionic liquid formed by a method which includes a step of combining a multidentate ethereal solvent with a salt mixture to produce a solvate. The salt mixture includes $Mg(BH_4)_2$ and the molar ratio of solvent to $Mg(BH_4)_2$ is within a range of 0.1:1 to 10:1, inclusive. The salt mixture can optionally include a second salt, which is $LiBH_4$, $NaBH_4$ or a combination thereof. The salt mixture can additionally include a third salt which has a lithium and/or magnesium cation and a fluorinated anion. In different variations, the third salt can include a magnesium or lithium fluorosulfonyl imide, trifluoromethano sulfonyl imide, or tetrafluoro borate. The salt mixture can optionally be ball-milled, and the solvate can optionally be mixed, for example by stirring, at room temperature or elevated temperature.

In another aspect an electrolyte composition comprising a solvo-ionic liquid is disclosed. The electrolyte composition is formed by a method that includes a step of combining a multidentate ethereal solvent with a salt mixture to produce a solvate. The salt mixture includes $Mg(BH_4)_2$ and the molar ratio of solvent to $Mg(BH_4)_2$ is within a range of 0.1:1 to 10:1, inclusive. The salt mixture can optionally include a second salt, which is $LiBH_4$, $NaBH_4$ or a combination thereof. The salt mixture can additionally include a third salt which has a lithium and/or magnesium cation and a fluorinated anion.

These and other features of the method for forming a solvo-ionic liquid and the electrochemical cell having the same will become apparent from the following detailed description when read in conjunction with the figures and examples, which are intended to be illustrative and not exclusive.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
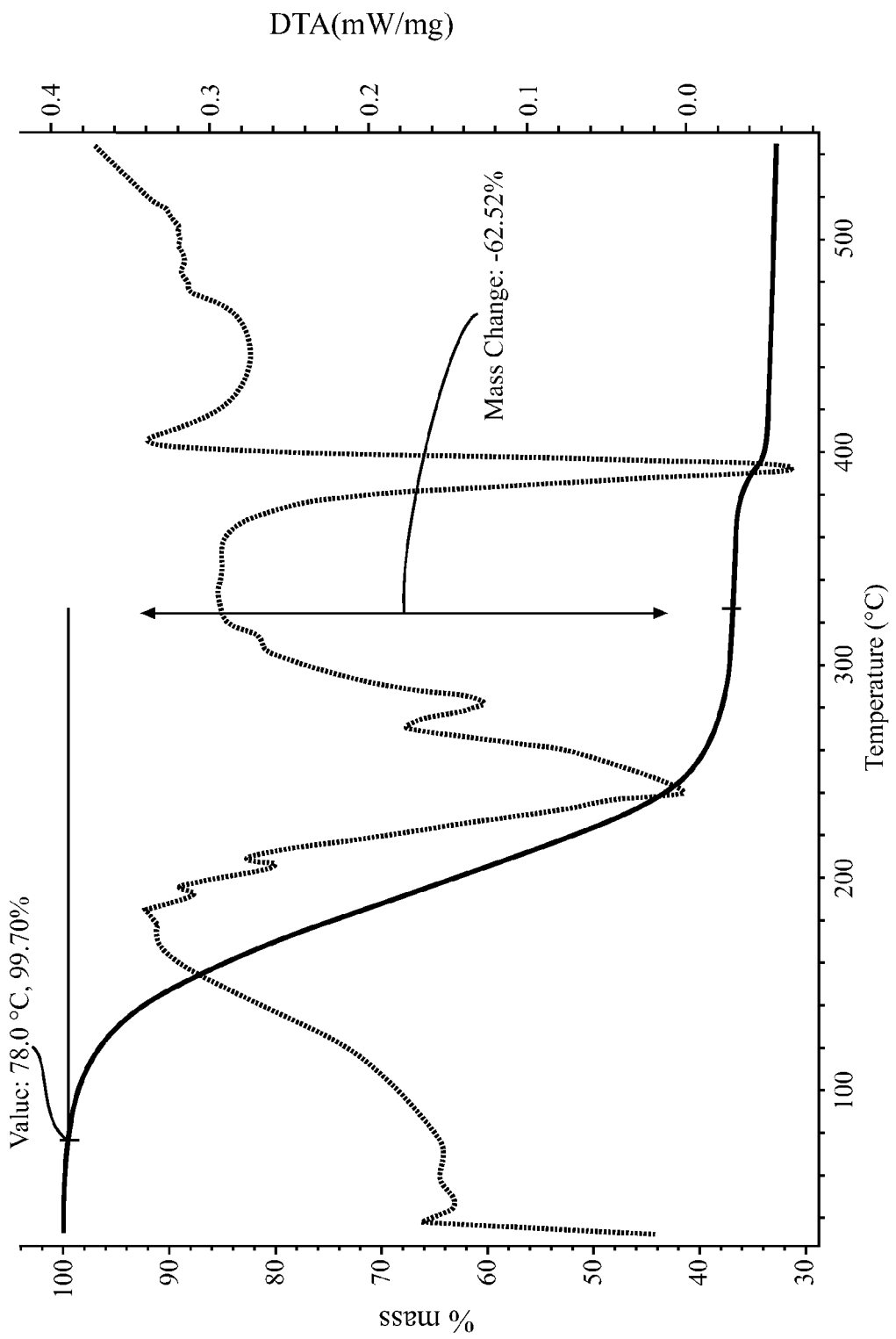
FIG. 1 is a graph of thermogravimetric and differential thermal analytical data of a solvo-ionic liquid consisting of $Mg(BH_4)_2$, $LiBH_4$, and dimethoxyethane at a 1:3:1 molar ratio.

The present disclosure provides methods for forming a type of composition termed "solvo-ionic liquid", as well as electrochemical cells having a solvo-ionic liquid. The solvo-ionic liquid has notable thermal stability and as such can have utility as an electrolyte in battery systems with elevated operating temperatures. Because the solvo-ionic liquid can in some instances be present as a solid or gel-like substance, it can also have utility as a conductive, protective layer fixed at the surface of an electrode such as a magnesium-containing anode in a magnesium battery.

The disclosed solvo-ionic liquids, which include magnesium borohydride and a multidentate ethereal solvent, along with other optional salts, form a liquid, oil-like substance, gel-like substance, or solid at room temperature, depending on the exact composition. Of significance, the disclosed solvo-ionic liquids are shown to have high thermal stability, including resistance to combustion or other chemical changes, as well as to evaporation, at temperatures substantially exceeding the flash points or evaporation points, respectively, of their constituents.

Accordingly, provided herein is a method for forming an electrolyte for use in an electrochemical cell, the electrolyte comprising a solvo-ionic liquid. The method comprises a step of combining a multidentate ethereal solvent with a salt mixture to produce a solvate. The salt mixture contains $Mg(BH_4)_2$ and the solvate has a molar ratio of solvent to $Mg(BH_4)_2$ within a range of 0.1:1 to 10:1, inclusive. In some implementations, the solvate has a molar ratio of solvent to $Mg(BH_4)_2$ within a range of 1:1 to 5:1, inclusive. The salt mixture can optionally be ball-milled prior to combining the multidentate ethereal solvent with the salt mixture.

As used herein, the phrase, "a multidentate ethereal solvent" refers to an ether having at least two ethereal oxygen atoms and which could be fluid or solid at standard temperature and pressure, at a battery operating temperature, or both. Exemplary multidentate ethereal solvents can include dimethoxyethane (dimethyl monoglyme, or glyme), diethylene glycol dimethyl ether (diglyme), triethylene glycol dimethyl ether (triglyme), tetraethylene glycol dimethyl ether (tetraglyme), another polyether such as a polyethylene glycol (PEG), or solid, high-molar-mass polymers (for example, poly(ethylene oxide), PEO). In some instances, PEG having a number average molecular weight (Mn) of 500 is employed.

While the resulting product is referred to as a solvo-ionic liquid, at standard temperature it can be a liquid, a viscous liquid or oil-like substance, a gel-like substance, or solid. If a solid, it can be ordered or amorphous. Whatever its phase under standard conditions of temperature and pressure, the solvo-ionic liquid will generally have a thermal stability, as determined for example by thermogravimetric analysis, comparable to the boiling point of its multidentate ethereal solvent. In some instances, the solvo-ionic liquid will have virtually no volatility as demonstrated by less than 1% mass loss during TGA at 200° C. and/or at a temperature within 50° C. of the boiling point of its multidentate ethereal solvent, whichever is lower. The lowest temperature at which the solvo-ionic liquid loses at least 1% of its mass during TGA will at times be referred to herein as a "lowest decomposition temperature". In general terms, and as described above, the lowest decomposition temperature of the solvo-ionic liquid will be equal to or greater than at least one of the following temperatures: i) 200° C. and ii) a temperature within 20° C. of the boiling point of the multidentate ethereal solvent employed.

While formation of the solvo-ionic liquid can be achieved in some instances without mixing of the solvate, the method can optionally include a mixing step. In some implementations, mixing the solvate can be achieved by stirring the solvate for a duration sufficient to result in solvo-ionic liquid formation. In some implementations, such a duration will be at least 24 hours. In some instances, such stirling can be performed at a temperature in the range of 25° C. to 150° C. In another implementation, mixing of the solvate can be achieved by ball-milling the solvate.

In some variations, the salt mixture will include a second salt. The second salt will typically include a borohydride anion and a hard Lewis acid cation. The hard Lewis acid cation is typically a simple cation of an alkali metal. Exemplary second salts include any of LiBH$_4$, NaBH$_4$, KBH$_4$, as well as any combination of the aforementioned. When present, the second salt will be included in the salt mixture at a molar ratio not to exceed 10:1 relative to Mg(BH$_4$)$_2$. In some implementations, the second salt can be present at an equimolar quantity relative to the multidentate ethereal solvent.

In other variations, the salt mixture can optionally include a third salt. When present, the third salt can include lithium, magnesium, or both as a cation. The third salt, when present, can also include a fluorinated anion. Exemplary fluorinated anions for use in the third salt include bis fluorosulfonyl imide (FSI), bis trifluoromethano sulfonyl imide (TFSI), and tetrafluoro borate. Thus, suitable example of the third salt which can be employed include LiFSI, LiTFSI, LiBF$_4$, Mg(FSI)$_2$, Mg(TFSI)$_2$, and Mg(BF$_4$)$_2$. When present, the second salt will be included in the salt mixture at a molar ratio not to exceed 10:1 relative to Mg(BH$_4$)$_2$. While the terms "second salt" and "third salt" are used here, it is to be understood that the third salt can be included in the salt mixture with or without the second salt.

Additionally disclosed is an electrolyte composition comprising a solvo-ionic liquid. The solvo-ionic liquid includes Mg(BH$_4$)$_2$ and is formed by the method as described above.

FIG. 1 shows the results of thermogravimetric analysis (TGA) and differential thermal analysis (DTA) of a solvo-ionic liquid formed by the disclosed method. The solvo-ionic liquid of FIG. 1 includes 1,2-dimethoxyethane (glyme) as the multidentate ethereal solvent. The solvo-ionic liquid of FIG. 1 further includes Mg(BH$_4$)$_2$, and the molar ratio of ethereal solvent to Mg(BH$_4$)$_2$ is 3:1. The solvo-ionic liquid of FIG. 1 additionally includes a second salt, LiBH$_4$, which is present at a molar ratio relative to Mg(BH$_4$)$_2$ of 3:1. Thus, the composition of the solvo-ionic liquid of FIG. 1 is Mg(BH$_4$)$_2$, LiBH$_4$, and glyme at a 1:3:3 molar ratio. The salts were combined and hand-mixed, glyme was slowly added to form the solvate, and the solvate was stirred at room temperature for 48 hours. The resulting solvo-ionic liquid formed as a translucent solid having a melting temperature of 58° C. As shown in FIG. 1, the solvo-ionic liquid is entirely resistant to thermogravimetric loss, including evaporative loss, to a temperature of 78° C. For comparative purposes, the flash point of pure glyme is about −2° C. and the boiling point is 85° C.

Figure 2:
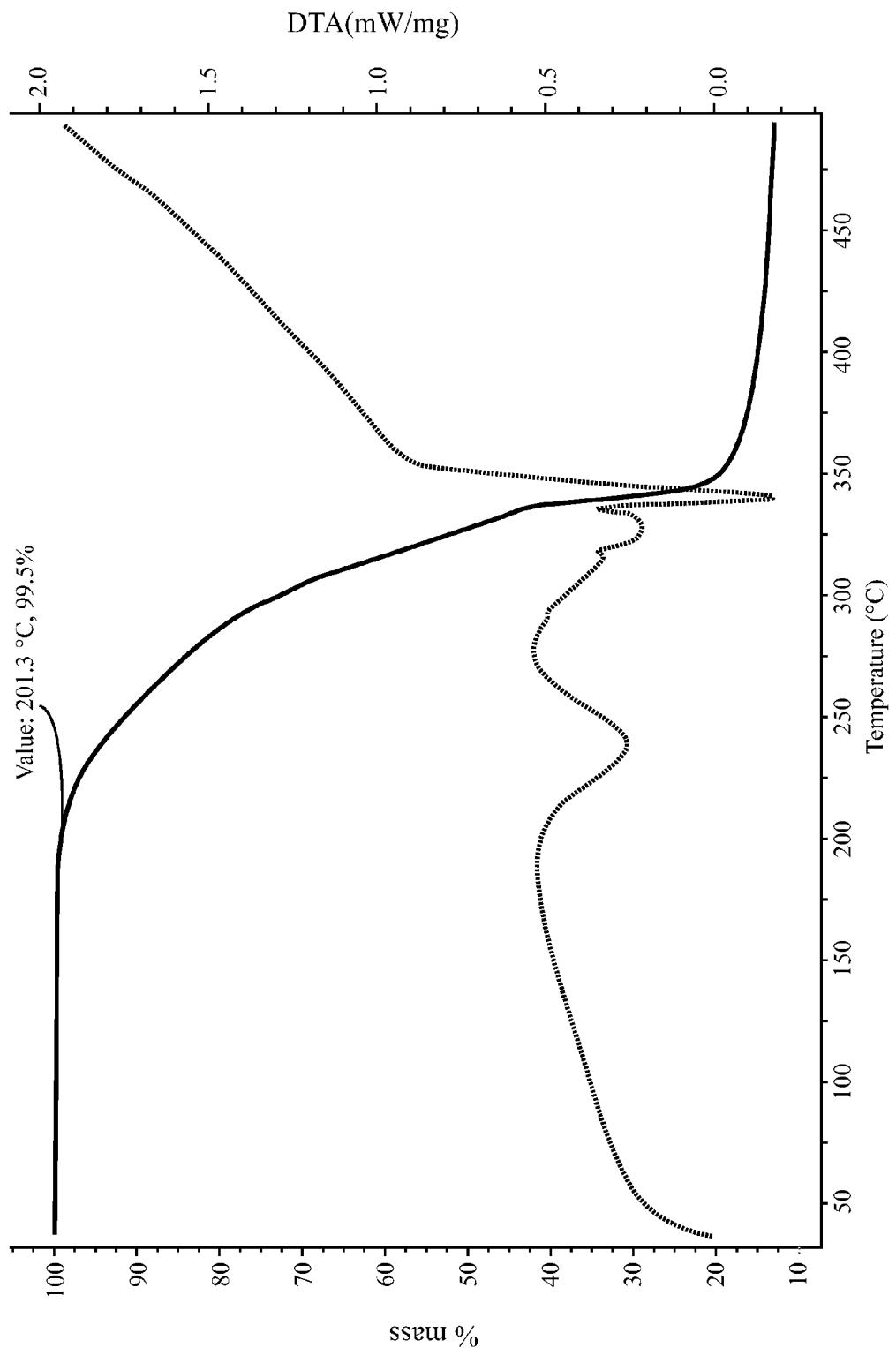
FIG. 2 is a graph of thermogravimetric and differential thermal analytical data of a solvo-ionic liquid consisting of $Mg(BH_4)_2$, $LiBH_4$, and polyethylene glycol (Mn=500) at a 1:2:1 molar ratio.

FIG. 2 shows TGA and DTA data for an alternative solvo-ionic liquid consisting of Mg(BH$_4$)$_2$, LiBH$_4$, and polyethylene glycol dimethyl ether, Mn=500 (PEG-500) at a molar ratio of 1:2:2. As above, the second salt (LiBH$_4$) was combined with Mg(BH$_4$)$_2$, to produce the salt mixture. The multidentate ethereal solvent, PEG-500, was slowly added to the salt mixture to produce the solvate, which was then stirred at room temperature for 48 hours. The resulting solvo-ionic liquid was a highly viscous liquid.

As shown in FIG. 2, the 1:2:2 Mg(BH$_4$)$_2$:LiBH$_4$:PEG-500 solvo-ionic liquid has considerable thermal stability, with a lowest decomposition temperature of 201° C.

Additionally provided herein is an electrochemical cell comprising a solvo-ionic liquid. The electrochemical cell will generally be a magnesium battery wherein a reduction/oxidation reaction according to Reaction I occurs:

$$Mg^0 \rightleftharpoons Mg^{2+}+2e^- \qquad\qquad\qquad\text{I.}$$

In many implementations, the electrochemical cell will be a secondary battery or a subunit of a secondary battery. In such implementations, it is to be understood that the term "anode" as used herein refers to an electrode at which magnesium oxidation occurs during cell discharge and at which magnesium reduction occurs during cell charging. Similarly, it is to be understood that the term "cathode" refers in such implementations to an electrode at which a cathode material reduction occurs during cell discharge and at which a cathode material oxidation occurs during cell charging.

The electrochemical cell has an anode, a cathode, and at least one external conductor, the at least one external conductor being configured to enable electrical communication between the anode and the cathode. The electrochemical cell further includes an electrolyte composition, the electrolyte composition comprising a solvo-ionic liquid formed by the method as described above. In implementations where the solvo-ionic liquid forms as a gel-like substance or a solid, the electrochemical cell can employ the solvo-ionic liquid as a solid electrolyte and/or as a conductive protective layer covering one or more surfaces of the anode, the cathode, or both.

The anode can comprise any material or combination of materials effective to participate in electrochemical oxidation of magnesium during a cell discharge. Similarly, the anode can comprise any material or combination of materials effective to participate in electrochemical reduction of magnesium cations and to incorporate reduced magnesium during a cell charging event. In some implementations, the anode can consist essentially of elemental magnesium (i.e. magnesium atoms having no formal charge) or comprise at least one surface layer of elemental magnesium. In other implementations, the anode can comprise an insertion-type magnesium electrode such as a tin electrode, containing magnesium in complex or alloy with other materials to the extent the cell is charged.

The cathode can comprise any material or combination of materials effective to participate in electrochemical insertion of magnesium cations during a cell discharge. Similarly, the cathode can comprise any material or combination of materials effective to participate in electrochemical extraction of magnesium during a cell charging event. Suitable but non-exclusive examples of such materials can include a Chevrel phase molybdenum composition such as $Mo_6S_8$ (reversibly $MgMo_6S_8$), $FeSiO_4$ (reversibly $MgFeSiO_4$), $K$-$\alpha MnO_2$, $MgFePO_4$, sulfur, organosulfur compounds, air or any other suitable materials.

In a simple implementation, the at least one external conductor can be a single conductor such as wire connected at one end to the anode and at an opposite end to the cathode. In other implementations, the at least one external conductor can include a plurality of conductors putting the anode and the cathode in electrical communication with a device configured to supply power to the electrochemical cell during a charging event, with other electrical devices situated to receive power from the electrochemical cell, or both.

Figure 3:
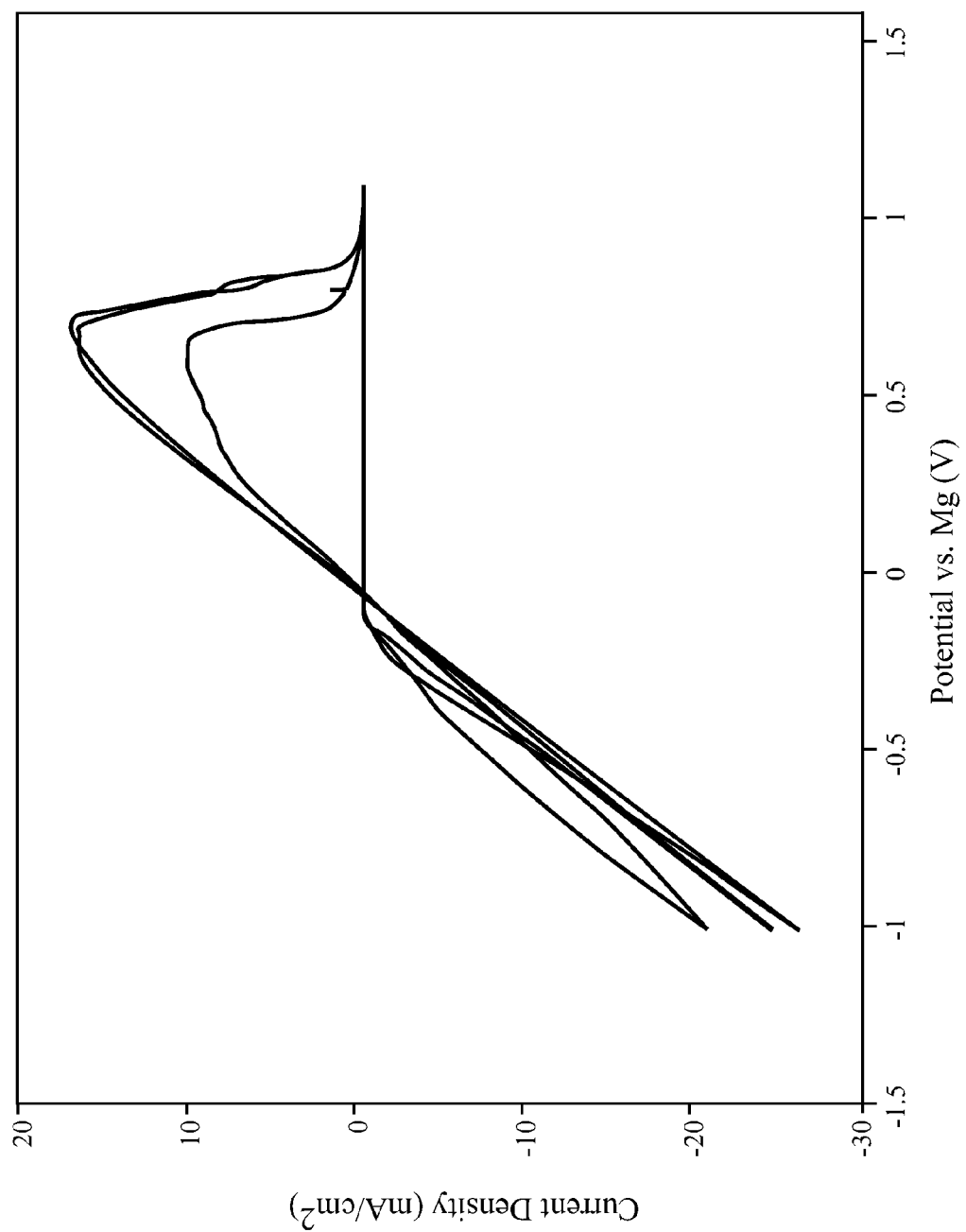
FIG. 3 is a cyclic voltammogram of a platinum (Pt) working electrode in contact with the solvo-ionic liquid of FIG. 1.

FIG. 3 shows a three-cycle voltammogram for an electrochemical cell having a platinum cathode as working electrode. The cathode is in contact with the solvo-ionic liquid of FIG. 1 (1:3:3 $Mg(BH_4)_2$:$LiBH_4$:glyme) as electrolyte. The counter and reference electrodes are both Mg. As was reported in related application U.S. Ser. No. 13/720,522, this solvo-ionic liquid shows an excellent ability to support reversible magnesium deposition/stripping as the electrolyte in a magnesium battery, with very low overpotentials for deposition/stripping (−0.11V overpotential for deposition and essentially no overpotential for stripping). The solvo-ionic liquid also supports high current density, reaching a maximum of nearly 20 $mA \cdot cm^{-2}$ under the test conditions.

Figure 4:
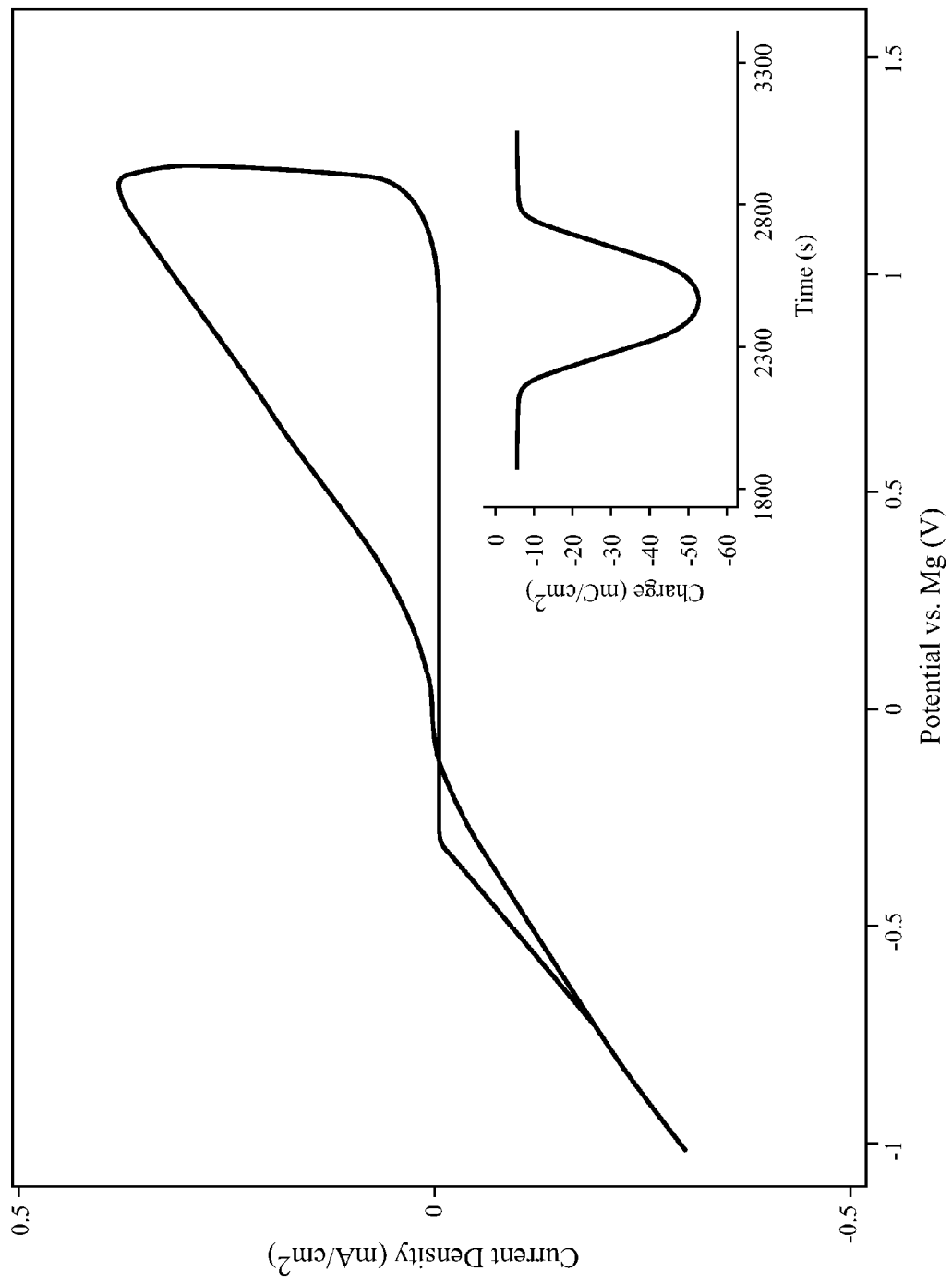
FIG. 4. is a cyclic voltammogram of a platinum (Pt) working electrode in contact with the solvo-ionic liquid of FIG. 2.

FIG. 4 shows a third cycle voltammogram at a platinum cathode in an electrochemical cell having the electrolyte of FIG. 2. The electrochemical cell having the 1:2:2 $Mg(BH_4)_2$:$LiBH_4$:PEG-500 electrolyte also has low overpotentials for deposition and stripping. The inset shows a deposition/stripping charge balance, indicative of a coulombic efficiency approaching 100%.

The present invention is further illustrated with respect to the following examples. It needs to be understood that these examples are provided to illustrate specific embodiments of the present invention and should not be construed as limiting the scope of the present invention.

EXAMPLE 1

Formation of Mg(BH4)$_2$:LiBH$_4$:glyme (1:3:3) Solvo-Ionic Liquid 0.44 g Mg(BH4)$_2$ was mixed with 0.54 g LiBH$_4$ (molar ratio of 1:3). 2.5 ml of monoglyme (1,2 dimethoxyethane) was slowly added and the mixtures vigorously stirred at room temperature for 48 hrs. Results have shown the successful preparation of an ionic liquid that is solid at room temperature and melts at 58° C. The solvo-ionic liquid has high compatibility with Mg metal as seen in the cyclic voltammetry results of FIG. 1.

EXAMPLE 2

Formation of $Mg(BH_4)_2$:$LiBH_4$:PEG-500 (1:3:3) Solvo-Ionic Liquid 0.2755 g $Mg(BH_4)_2$ was mixed with 0.22 g $LiBH_4$ (molar ratio of 1:3). 4.8 ml of polyethylene glycol dimethyl ether having a number average molecular weight (Mn) of 500 dalton was slowly added to the mixture and then vigorously stirred at room temperature for 48 hrs. Results have shown the successful preparation of a highly viscous liquid.

EXAMPLE 3

Preparation of Electrochemical Cells and Testing Thereof

Electrochemical testing was conducted in a three-electrode BASi 4 dram shell vial placed inside an MBraun glove box at 25° C. at less than 0.1 ppm $O_2$ and $H_2O$ content. The electrodes used in all experiments were as follows: working electrode—0.02 cm$^2$ platinum; counter electrode—magnesium ribbon (BASi); reference electrode—magnesium wire (BASi). All electrodes were polished, sonicated, and kept in a dry vacuum oven prior to each experiment. The surfaces of all magnesium electrodes were rubbed with a glass slide prior to use to remove any possible oxides.

Electrochemical testing was conducted using a BioLogic potentiostat run at a scan rate of 5 mV•s$^{-1}$ and data were acquired and analyzed with EC-lab Software®. Since the reference electrode used was a magnesium wire, the electrochemical testing was conducted in a voltage range within −1 and 1 V in order to limit the electrochemical activity solely to magnesium deposition and stripping.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for forming an electrolyte composition, the method comprising:
    combining a multidentate ethereal solvent with a salt mixture to produce a solvate, the salt mixture containing $Mg(BH_4)_2$, and the solvate having a molar ratio of multidentate ethereal solvent to $Mg(BH_4)_2$ within a range of 0.1:1 to 10:1, inclusive, wherein the molar ratio of $Mg(BH_4)_2$ to ethereal solvent exceeds the solubility limit of $Mg(BH_4)_2$ in the ethereal solvent.

2. The method as recited in claim 1 wherein the salt mixture further includes a second salt, the second salt being $LiBH_4$, $NaBH_4$ or a combination thereof; and the second salt being present at a molar ratio relative to $Mg(BH_4)_2$ not greater than 10:1.

3. The method as recited in claim 1, wherein the salt mixture further includes a third salt, the third salt having:
    at least one of a lithium cation and a magnesium cation; and
    a fluorinated anion;

wherein the third salt is present at a molar ratio relative to $Mg(BH_4)_2$ not greater than 10:1.

4. The method as recited in claim 3, wherein the third salt is $Mg(TFSI)_2$ (bis trifluoromethano sulfonyl imide), $Mg(FSI)_2$ (bis fluorosulfonyl imide), $Mg(BF_4)_2$, LiTFSI, LiFSI, LiBF$_4$, or a combination thereof.

5. The method as recited in claim 1 further comprising a step of ball-milling the salt mixture prior to combining the multidentate ethereal solvent with the salt mixture.

6. The method as recited claim 1, comprising the step of:
producing the electrolyte composition as a solvo-ionic liquid tat forms any of a liquid, a viscous liquid, an oil-like substance, a gel-like substance, or a solid at standard temperature.

7. The method as recited in claim 1 further comprising a step of:
mixing the solvate for a duration of at least 24 hours.

8. The method as recited in claim 1, wherein the multidentate ethereal solvent comprises glyme, diglyme, triglyme, tetraglyme, polyethylene glycol or polyethylene oxide.

9. The method as recited in claim 1 wherein the electrolyte composition is characterized by a lowest decomposition temperature, the lowest decomposition temperature being equal to or greater than at least one of the following temperatures:
200° C.; and
a temperature within 20° C. of the boiling point of the multidentate ethereal solvent.

10. An electrochemical cell having:
an anode comprising elemental magnesium;
a cathode; and
an electrolyte composition comprising a solvo-ionic liquid that includes $Mg(BH_4)_2$ and a multidentate ethereal solvent, the $Mg(BH_4)_2$ and multidentate ethereal solvent present at a molar ratio within a range of 0.1:1 to 10:1, inclusive, the solvo-ionic liquid formed by a method comprising:
combining a multidentate ethereal solvent with a salt mixture to produce a solvate, the salt mixture containing $Mg(BH_4)_2$, and the solvate having a molar ratio of solvent to $Mg(BH_4)_2$ within a range of 0.1:1 to 10:1, inclusive.

11. The electrochemical cell as recited in claim 10 wherein the salt mixture further includes a second salt which is LiBH$_4$, NaBH$_4$ or a combination thereof, the second salt being present at a molar ratio not to exceed 10:1 relative to $Mg(BH_4)_2$.

12. The electrochemical cell as recited in claim 10, wherein the salt mixture further includes a third salt, the third salt having:
at least one of a lithium cation and a magnesium cation; and
a fluorinated anion
wherein the third salt is present at a molar ratio relative to $Mg(BH_4)_2$ not greater than 10:1.

13. The electrochemical cell as recited in claim 12, wherein the third salt is $Mg(TFSI)_2$ (bis trifluoromethano sulfonyl imide), $Mg(FSI)_2$ (bis fluorosulfonyl imide), $Mg(BF_4)_2$, LiTFSI, LiFSI, LiBF$_4$, or a combination thereof.

14. The electrochemical cell as recited in claim 10 further comprising a step of ball-milling the salt mixture.

15. The electrochemical cell as recited in claim 10 further comprising a step of mixing the solvate, the mixing step being performed by stirring for a duration of at least one day.

16. The electrochemical cell as recited in claim 10 wherein the electrolyte composition is characterized by a lowest decomposition temperature, the lowest decomposition temperature being equal to or greater than at least one of the following temperatures:
200° C.; and
a temperature within 20° C. of the boiling point of the multidentate ethereal solvent.

17. An electrolyte composition comprising a solvo-ionic liquid that includes $Mg(BH_4)_2$ and a multidentate ethereal solvent, the $Mg(BH_4)_2$ and ethereal solvent present at a molar ratio within a range of 0.1:1 to 10:1, inclusive, the solvo-ionic liquid formed by a method comprising:
adding a multidentate ethereal solvent to a salt mixture containing $Mg(BH_4)_2$;
wherein the multidentate ethereal solvent is added to the salt mixture at a molar ratio ranging between 0.1:1 and 10:1 relative to $Mg(BH_4)_2$.

18. The electrolyte composition as recited in claim 17 wherein the salt mixture further includes a second salt, the second salt being LiBH$_4$, NaBH$_4$ or a combination thereof; and the second salt being present at a molar ratio relative to $Mg(BH_4)_2$ not greater than 10:1.

19. The electrolyte composition as recited in claim 17 wherein the salt mixture further includes a third salt, the third salt having:
at least one of a lithium cation and a magnesium cation; and
a fluorinated anion;
wherein the third salt is present at a molar ratio relative to $Mg(BH_4)_2$ not greater than 10:1.

20. The electrolyte composition as recited in claim 17 which is characterized by a lowest decomposition temperature, the lowest decomposition temperature being equal to or greater than at least one of the following temperatures:
200° C.; and
a temperature within 20° C. of the boiling point of the multidentate ethereal solvent.

* * * * *